United States Patent
Lee et al.

(10) Patent No.: US 8,179,246 B2
(45) Date of Patent: May 15, 2012

(54) INDICATION CLOTHING

(75) Inventors: James Lee, Taipei (TW); Hong Hsu Huang, Taipei (TW)

(73) Assignee: Tex-Ray Industrial Co., Ltd., Taipei (TW)

( * ) Notice: Subject to any disclaimer, the term of this patent is extended or adjusted under 35 U.S.C. 154(b) by 422 days.

(21) Appl. No.: 12/480,172

(22) Filed: Jun. 8, 2009

(65) Prior Publication Data

US 2010/0309009 A1    Dec. 9, 2010

(51) Int. Cl.
*B60Q 1/22* (2006.01)
(52) U.S. Cl. .................. 340/463; 430/467; 430/432
(58) Field of Classification Search .................. 340/432, 340/463–469, 473, 479, 531, 573.1, 699, 340/815.42–815.45; 369/55; 600/595
See application file for complete search history.

(56) References Cited

U.S. PATENT DOCUMENTS

| 5,241,300 | A | * | 8/1993 | Buschmann | 340/573.1 |
| 7,907,838 | B2 | * | 3/2011 | Nasiri et al. | 396/55 |
| 2007/0063831 | A1 | * | 3/2007 | Perkins et al. | 340/479 |
| 2010/0036288 | A1 | * | 2/2010 | Lanfermann et al. | 600/595 |
| 2010/0251453 | A1 | * | 10/2010 | Chen | 2/69 |

* cited by examiner

*Primary Examiner* — Van T. Trieu
(74) *Attorney, Agent, or Firm* — Patterson Thuente Christensen Pedersen, P.A.

(57) ABSTRACT

An indication clothing being adapted to be worn by an object is provided. The indication clothing comprises an indication sign, a storage module, a G-sensor and a process module. The storage module is configured to store threshold information. The G-sensor is configured to sense an instantaneous moving action of the object and generate a sensed value related to the instantaneous moving action when the object is moving. The process module is electrically connected to the indication sign, the G-sensor and the storage module, and is configured to control the indication sign by comparing the sensed value with the threshold information so that the indication sign indicates the instantaneous moving action of the object.

13 Claims, 10 Drawing Sheets

INDICATION CLOTHING

CROSS-REFERENCES TO RELATED APPLICATIONS

Not applicable.

BACKGROUND OF THE INVENTION

1. Field of the Invention

The present invention relates to an indication clothing. More specifically, the present invention relates to an indication clothing, which is able to indicate the moving action of an object via an indication sign when the indication clothing is worn by the object.

2. Descriptions of the Related Art

In recent years, bike riding is more and more popular to people. It can not only save energy resources, but also protect the environment from air pollution. For these advantages, more people prefer riding their bikes on the road.

However, there are also other vehicles, such as buses, cars and motorcycles, and passengers on the road. In this situation, if a bike does not mount any indication sign to indicate their instantaneous moving actions to surrounding bikes, vehicles and passengers, the bike rider will take a risk of the traffic accident. As a result, it is necessary to mount an indication sign on a bike to indicate its instantaneous moving actions for reducing the risk of the traffic accident.

Unfortunately, a bike is usually small in size and lightweight so that it is not easy to mount an indication sign, such as a brake sign, a left-turn sign and a right-turn sign, to indicate its instantaneous moving action. Even if the bike can mount the indication sign to indicate its instantaneous moving action, it does not have sufficient space to mount a conspicuous indication sign. Thus, there is still not a solution to efficiently reduce the risk of the traffic accident when people ride their bikes on the road.

In summary, in the premise that the size of the bike is not changed, how to make the indication sign be obvious and easy to be noticed is still an objective for the industry to endeavor.

SUMMARY OF THE INVENTION

The primary objective of this invention is to provide an indication clothing being adapted to be worn by an object. The indication clothing comprises an indication sign, a storage module, a G-sensor and a process module. The storage module is configured to store threshold information. The G-sensor is configured to sense an instantaneous moving action of the object and generate a sensed value related to the instantaneous moving action when the object is moving. The process module is electrically connected to the indication sign, the G-sensor and the storage module, and is configured to control the indication sign by comparing the sensed value with the threshold information so that the indication sign indicates the instantaneous moving action of the object.

In summary, the indication clothing of the present invention is adapted to be worn by an object (e.g. a person riding a bike). The indication clothing can senses the instantaneous moving action of the person, such an instantaneous brake action, an instantaneous left-turn action and an instantaneous right-turn action, and indicate the instantaneous moving action via an correspond indication sign positioned on it. Thereby, the indication sign may indicate the instantaneous moving action of the person to other vehicles, bikes and passengers on the road so that they can notice the instantaneous moving action to prevent a traffic accident. Hence, the present invention may efficiently reduce the risk of traffic accident and overcome the defects of the conventional techniques.

The detailed technology and preferred embodiments implemented for the present invention are described in the following paragraphs accompanying the appended drawings for people skilled in this field to well appreciate the features of the claimed invention.

DESCRIPTION OF THE PREFERRED EMBODIMENT

The present invention provides an indication clothing so that a person who rides his bike can wear it to indicate the instantaneous moving actions he takes, such as an instantaneous brake (deceleration) action, an instantaneous left-turn action and an instantaneous right-turn action. Via indication clothing, people surrounding the bike can notice the marching status of the bike to prevent a traffic accident. Particularly, the indication clothing may be adapted to be worn by an object. When the object is moving, the indication clothing can senses an instantaneous moving action of the object and control an indication sign positioned on it to indicate the instantaneous moving action. It should be noted that all the indication signs used in the present invention are big enough to be easy to notice by people.

Figure 1:
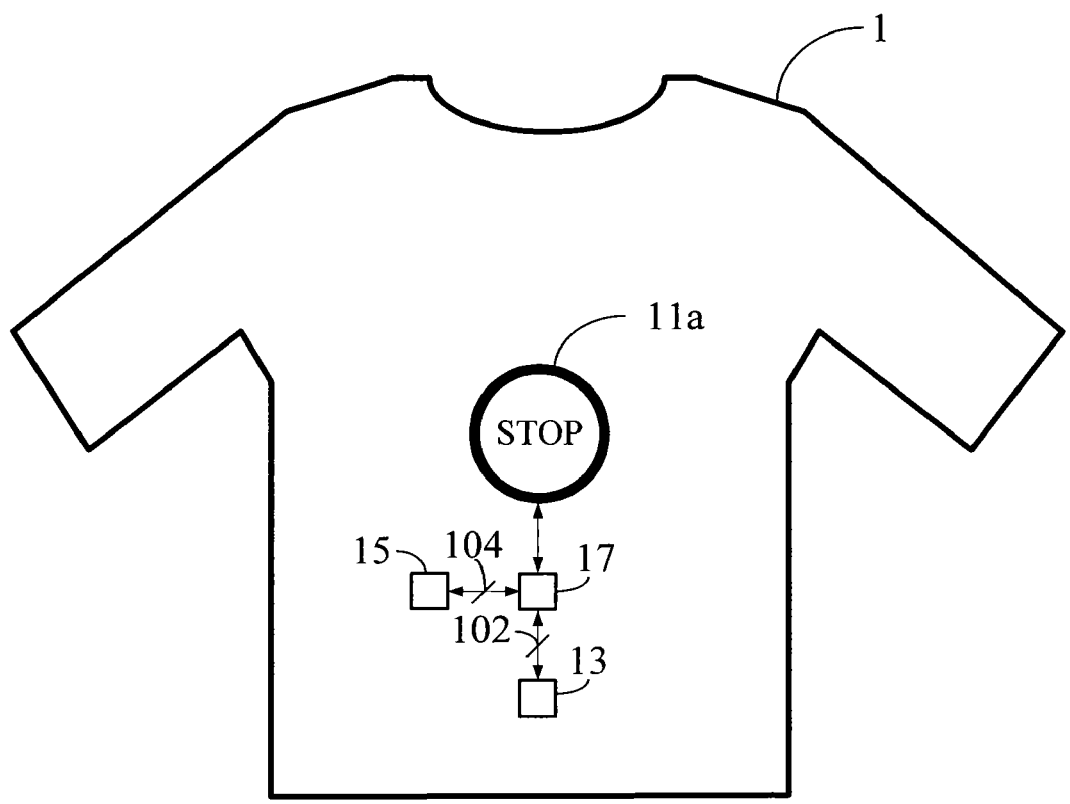
FIG. 1 illustrates a first embodiment in accordance with the present invention.

A first embodiment of the present invention is shown in FIG. 1, which illustrates an indication clothing 1 that can be adapted to be worn by a person (i.e. an object) who rides his bike. The indication clothing 1 comprises an indication sign 11a, a G-sensor 13, a storage module 15, and a process module 17. The process module 17 is electrically connected to the indication sign 11a, the G-sensor 13 and the storage module 15. In this embodiment, the indication sign 11a is a brake sign for indicating the instantaneous deceleration action.

The G-sensor 13 of the indication clothing 1 is configured to sense the instantaneous deceleration action and generate a combined vector 102 related to the instantaneous deceleration action when the person brakes the bike. The storage module 15 is configured to store threshold information 104 which is related to the combined vector 102 and can be adjusted by a user. The process module 17 is configured to generate a sensed value according to the combined vector 102 and control the indication sign 11a by comparing the sensed value with the threshold information 104. In particular, the combined vector 102 generated by the G-sensor 13 comprises 3D coordinates vector (e.g., the x-axis vector, the y-axis and the z-axis), that is well-known to persons skilled in the art and not described further. However, the 3D coordinates vector does not corresponds to the instantaneous deceleration action necessarily in 3D coordinates system. In the present invention, for the accuracy of comparison, the process module 17 transforms the combined vector 102 to generate the sensed value, which corresponds to the instantaneous deceleration action accurately, before comparing. The functions of the sensed value will be described in the following paragraphs.

The indication sign 11a comprises a light-emitting component controlled by the process module 17 to light up for a period of time, e.g. about 2 to 3 seconds, and then to shut off. If the sensed value and the threshold have the same sign and if the absolute value of the sensed value exceeds the absolute value of a threshold of the threshold information 104, the process module 17 controls the light-emitting component of the indication sign 13a to light up. The light-emitting component can be one of a light-emitting diode, a fiber optic, an organic light-emitting diode (OLED), an electroluminence (EL), an EL wire, an interferometric modulation (IMOD) and a light bulb, etc. It is noted that the light-emitting component is controlled to light up means that the light-emitting component is controlled to light up for a period of time and then to shut off after the period of time.

More particularly, the sensed value indicates the instantaneous deceleration action along three orthogonal axes that are an x-axis, a y-axis, and a z-axis. Herein, the x-axis is parallel to the direction that the bike goes forward. The y-axis is parallel to the turning direction that the bike turns right or left. The z-axis is parallel to the vertical direction that is perpendicular to a horizontal plane which is defined by the x-axis and the y-axis. Thus, the sensed value includes an x-axis acceleration, a y-axis acceleration, and a z-axis acceleration corresponding to the instantaneous deceleration action along three orthogonal axes. The threshold information 104 also includes an x-axis threshold, a y-axis threshold, and a z-threshold for the process module 17 determines the instantaneous deceleration action.

The instantaneous deceleration action occurs because the person brakes the bike. Hence, the process module 17 appropriately compares the x-axis acceleration with the x-axis threshold to control the light-emitting component of the indication sign 11a. In this embodiment, the x-axis threshold has a first x-axis threshold and a second x-axis threshold, wherein the first x-axis threshold is negative, while the second x-axis threshold is positive. If the x-axis acceleration is negative and its absolute value exceeds the absolute value of the first x-axis threshold (which is negative as well), it means that the person brakes the bike. For example, when the x-axis acceleration is −3 g and the first x-axis threshold is −1.5 g, the process module 17 controls the light-emitting component of the indication sign 11a to light up to indicates the person brakes the bike since both of them are negative and the absolute value of −3 g (i.e. |−3|g) exceeds the absolute value of −1.5 g (i.e. |−1.5|g).

Besides, if the instantaneous moving action is an instantaneous acceleration action, the x-axis acceleration would be positive. In this case, if the absolute value of the x-axis acceleration exceeds the absolute value of the second x-axis threshold (which is positive as well), it means that the person is starting the bike up. For example, when the x-axis acceleration is 2 g and the second x-axis threshold being 1 g, the person is starting the bike up because both the values are positive and the absolute value of 2 g (i.e. 2 g) exceeds the absolute value of 1 g (i.e. 1 g). It is noted that the roles of the positive sign and the negative sign may be switched in other embodiment.

In some special case, when the person rides his bike up or down a hill, the instantaneous deceleration action and the instantaneous acceleration action also have a component of deceleration and acceleration along the z-axis, respectively. Thus, the process module 17 can further compare the z-axis acceleration with the z-axis threshold, so as to accurately detect the instantaneous deceleration action or the instantaneous acceleration action. Thus, people surrounding the bike can notice the brake sign being lighted up to be aware to prevent a traffic accident.

Figure 2:
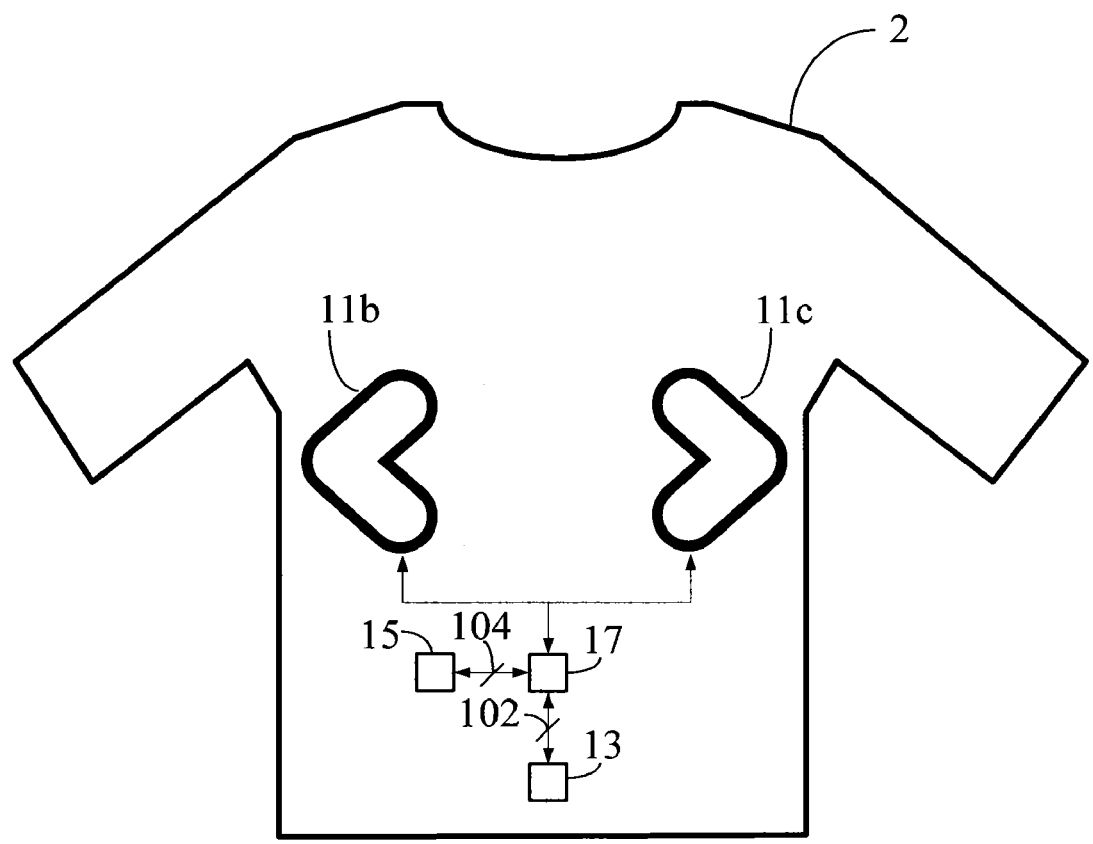
FIG. 2 illustrates a second embodiment in accordance with the present invention.

A second embodiment of the present invention is shown in FIG. 2, which illustrates an indication clothing 2 that can be adapted to be worn by a person who rides his bike. Similar to the first embodiment, the indication clothing 2 comprises the G-sensor 13, the storage module 15, and the process module 17. The only difference to the first embodiment is the indication clothing 2 comprises two indication signs 11b, 11c, not the indication sign 11a mentioned in the first embodiment. The indication sign 11b is a left-turn sign for indicating an instantaneous left-turn action when the person operates the bike to turn left. The indication sign 11c is a right-turn sign for indicating an instantaneous right-turn action when the person operates the bike to turn right. Each of indication signs 11b, 11c comprises a light-emitting component.

In this embodiment, the y-axis threshold has a first y-axis threshold and a second y-axis threshold, wherein the first y-axis threshold is negative, while the second y-axis threshold is positive. The G-sensor 13 would sense the instantaneous left-turn action and generates a combined vector 102 related to the instantaneous left-turn action when the person operates the brake to turn left. The process module 17 generates the sensed value according to the combined vector 102 and consequently compares a y-axis acceleration of the sensed value with the y-axis threshold. If the y-axis acceleration is negative and its absolute value exceeds the absolute value of the first y-axis threshold (which is negative as well), for example the y-axis acceleration is −2 g and the first y-axis threshold is −1 g, the process module 17 consequently controls the light-emitting component of the indication sign 11b to light up to indicate the person operates the bike to turn left. Accordingly, other people surrounding the bike can see the left-turn sign being lighted up to be aware to prevent a traffic accident.

Similarly, the G-sensor 13 also senses the instantaneous right-turn action and generates a combined vector 102 related to the instantaneous right-turn action when the person operates the bike to turn right. Then, the process module 17 generates the sensed value according to the combined vector 102 and then compares a y-axis acceleration of the sensed value with the y-axis threshold. If y-axis acceleration is positive and its absolute value exceeds the absolute value of the second y-axis threshold (which is positive as well), for example the y-axis acceleration is 2 g and the second y-axis threshold is 1 g, the process module 17 consequently controls the light-emitting component of the indication sign 11c to light up to indicate the person operates the bike to turn left. Therefore, other people surrounding the bike can see the right-turn sign being lighted up to be aware to prevent a traffic accident.

Since the instantaneous right-turn action and instantaneous left-turn action usually also accompany with the an instantaneous deceleration action, the process module 17 can further compares a x-axis acceleration with the x-axis threshold to determine the instantaneous right-turn action and instantaneous left-turn action for more accuracy.

Figure 3:
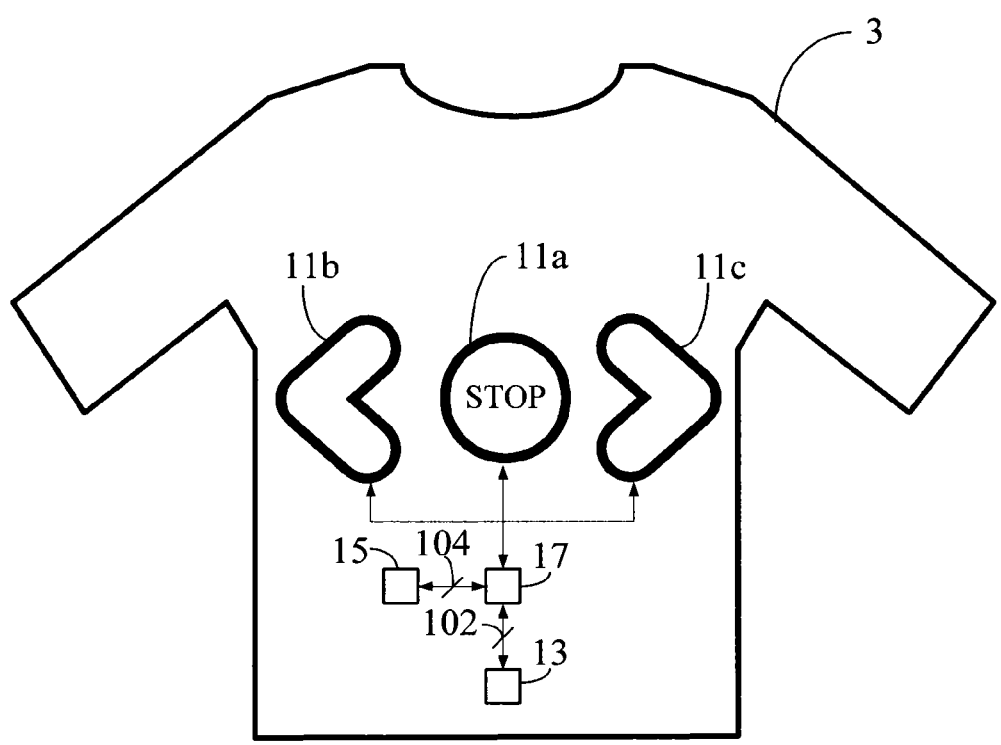
FIG. 3 illustrates a third embodiment in accordance with the present invention.

A third embodiment, of the present invention is shown in FIG. 3, which illustrates an indication clothing 3 that can be adapted to be worn by a person who rides his bike. The indication clothing 3 combines all technical features recited in first embodiment and second embodiment. In short, the indication clothing 3 comprises the indication signs 11a, 11b and 11c, the G-sensor 13, the storage module 15 and the process module 17. Those skilled in the art can straightforwardly realize how the third embodiment performs these operations and functions based on the above descriptions of the first embodiment and second embodiment. Thus, no unnecessary details are given here.

It is noted that in other embodiments, the instantaneous moving actions can be different to these described in above embodiments, for example, an instantaneous jump action. Thus, the aforementioned instantaneous moving actions aren't used to limit the scope of the present invention, just for giving examples.

Figure 4:
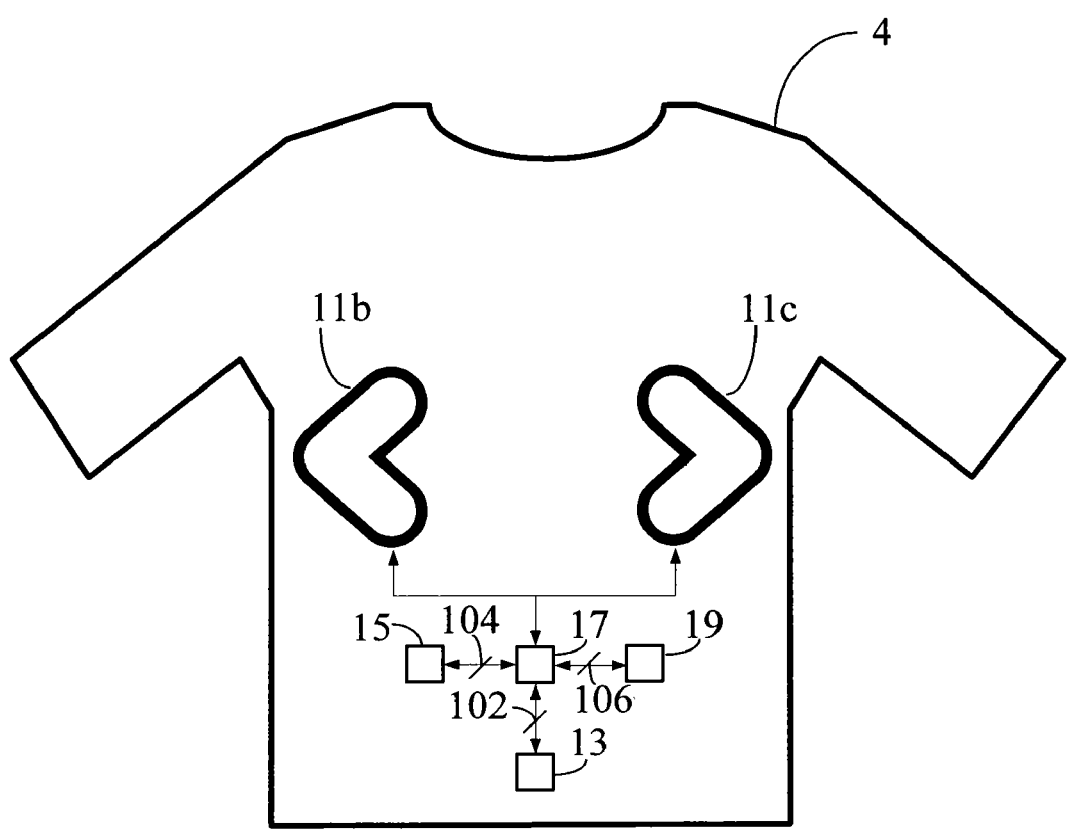
FIG. 4 illustrates the second embodiment with a gyroscopic sensor.
Figure 5:
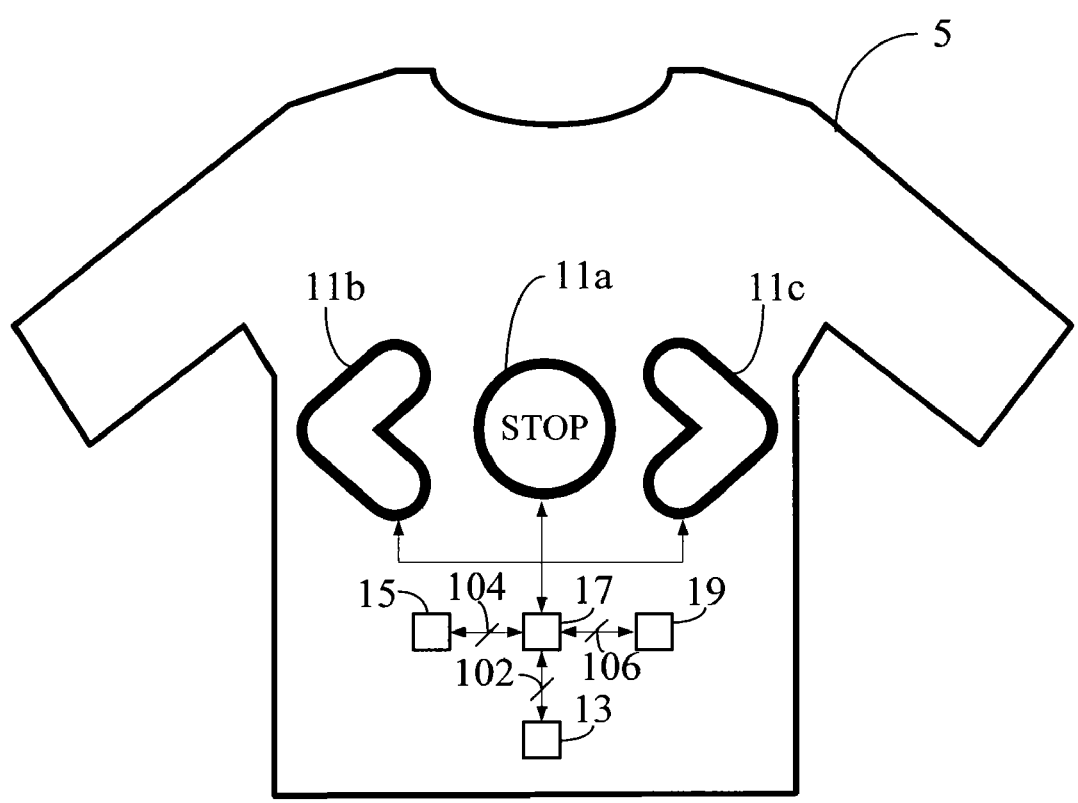
FIG. 5 illustrates the third embodiment with a gyroscopic sensor.

In addition to the aforementioned, please refer to FIG. 4 and FIG. 5, the indication clothing 4, 5 can further comprise a gyroscopic sensor 19 in aid of the G-sensor 13 to more accurately sense the instantaneous moving action, especially the instantaneous left-turn action and the instantaneous right-turn action. The gyroscopic sensor 19 can be configured to sense a horizontal rotation of the person and generate a rotation value 106 related to the horizontal rotation. Moreover, the threshold information 104 further includes a horizontal rotation threshold. The process module 17 further compares the rotation value 106 with the horizontal rotation threshold to control the indication sign. For example, when the person turns left, he may usually bend his body to left so that the gyroscopic sensor senses the horizontal rotation duo to the bend. In this way, the process module 17 can advantageously use the x-axis acceleration, y-axis acceleration and the rotation value 106 to determine the instantaneous left-turn action.

Figure 6:
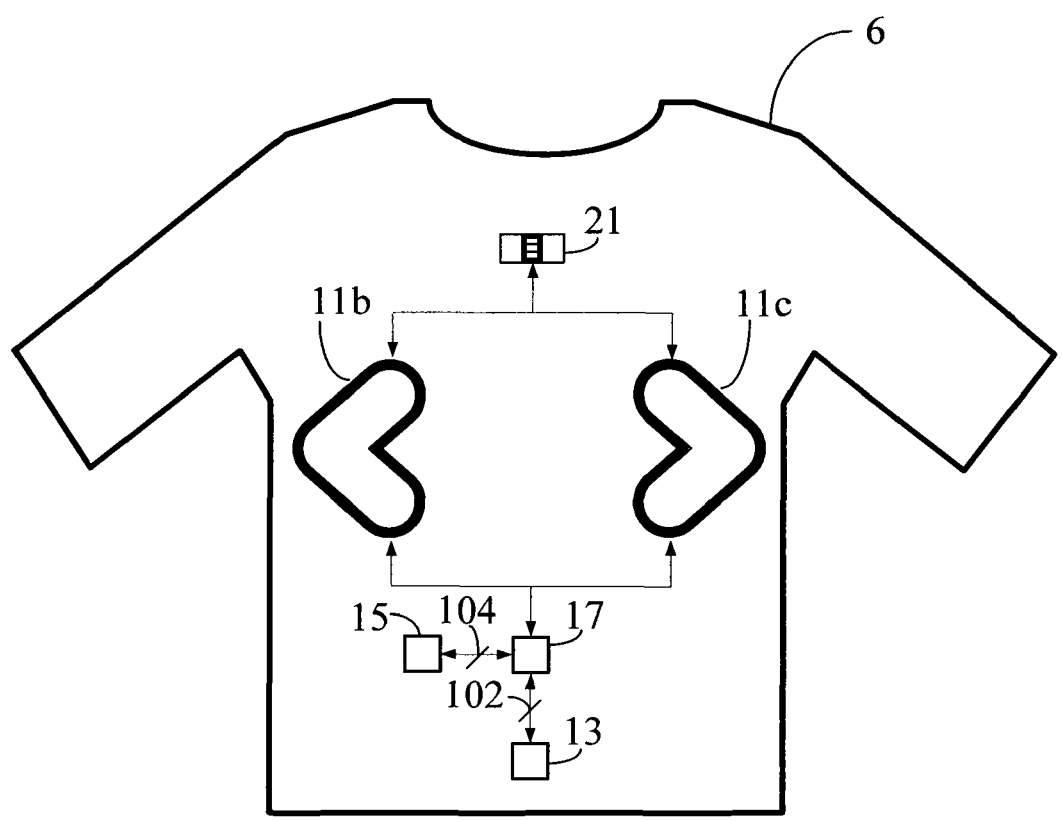
FIG. 6 illustrates the second embodiment with a switch.
Figure 7:
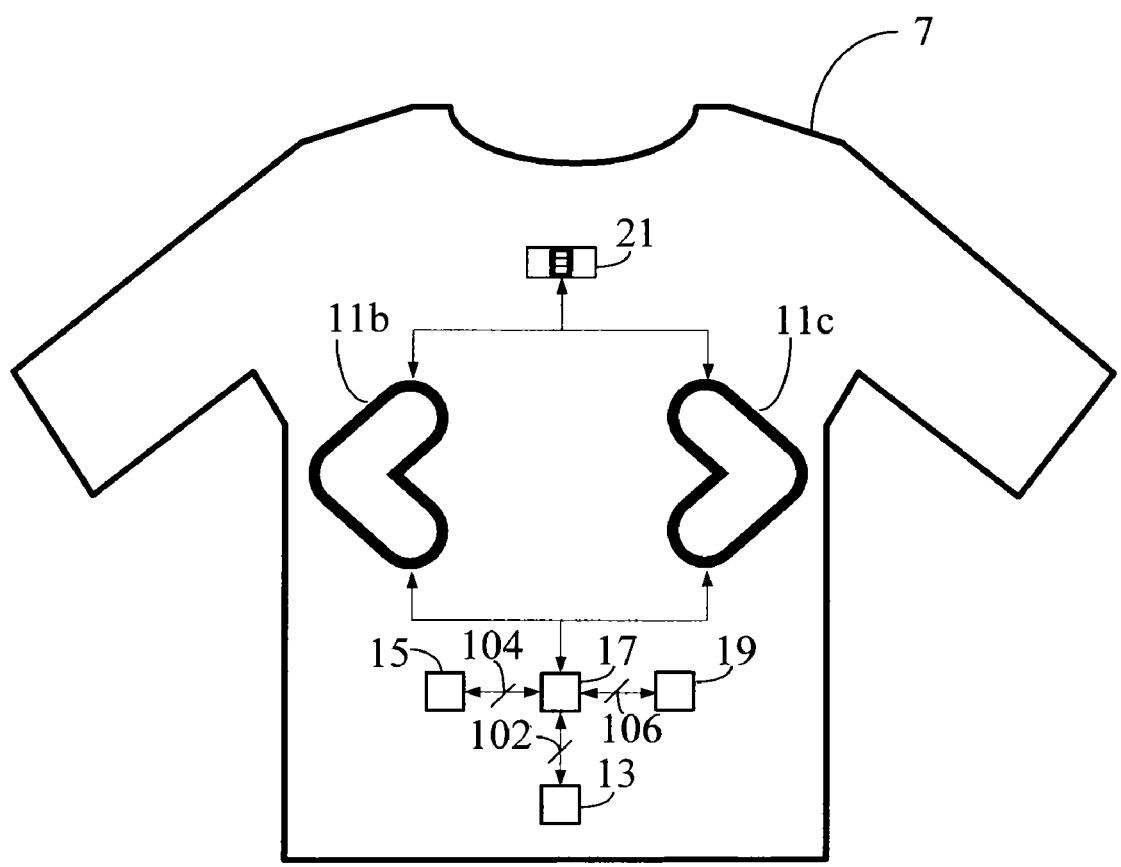
FIG. 7 illustrates the third embodiment with a switch.

Please further refer to FIG. 6 to FIG. 7, the indication clothing 6, 7 can further comprise a switch 21 which is electrically connected to the indication signs 11b, 11c for manually controlling the indication signs 11b, 11c. Specifically, in some situations, the indication signs 11b, 11c may be used to indicate the coming actions that can be expected, instead of the instantaneous moving actions. For example, the person who wears the indication clothing 6,7 can use the switch 21 to light up the indication signs 11b to indicate he will operate the bike to turn left. Therefore, other people surrounding the bike can be aware that the bike will turn left when the left-turn sign is lighted up, so as to prevent a traffic accident.

Figure 8:
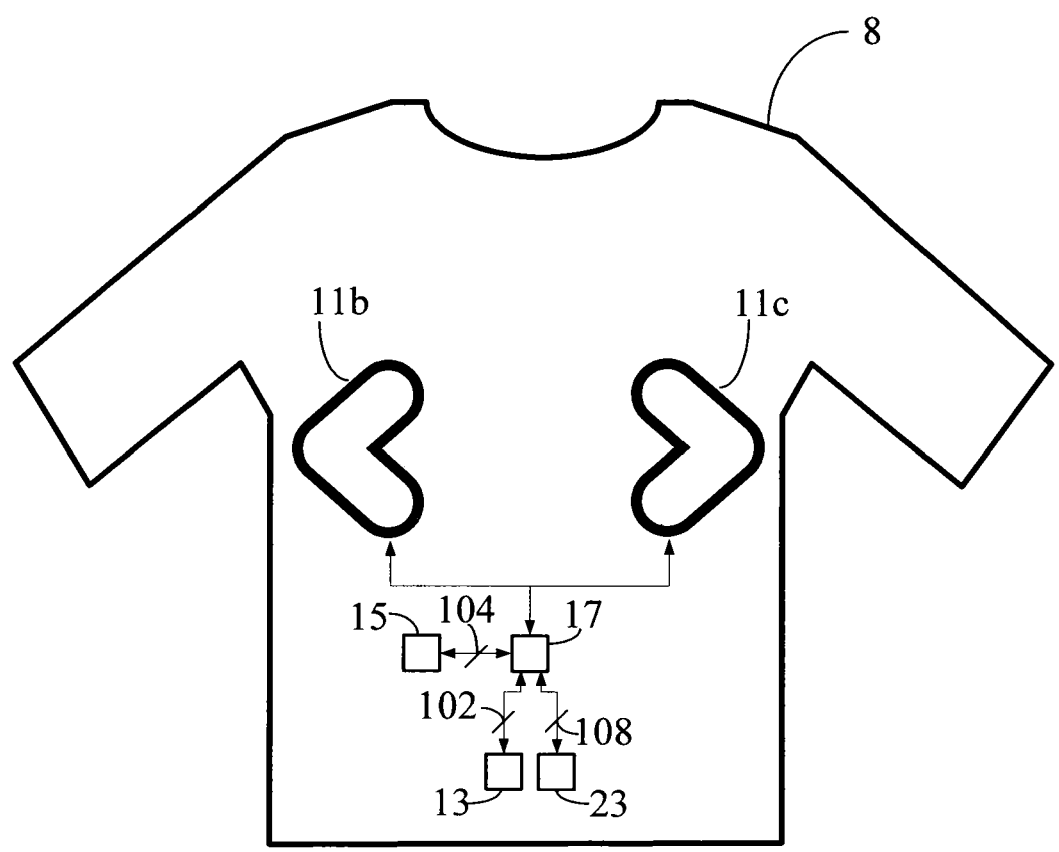
FIG. 8 illustrates the second embodiment with a receiver.
Figure 9:
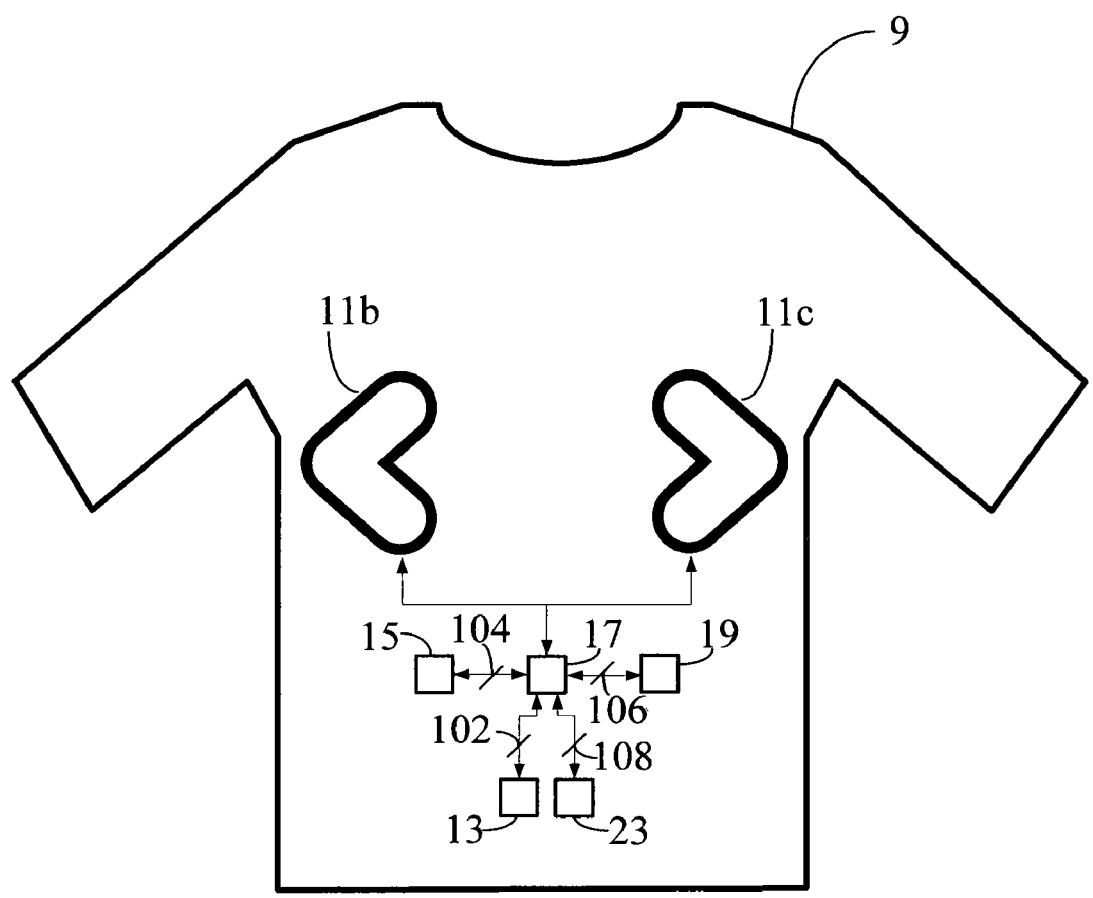
FIG. 9 illustrates the third embodiment with a receiver.

Moreover, please refer to FIG. 8 and FIG. 9, the indication clothing 8, 9 can further comprise a receiver 23. The receiver 23 is electrically connected to the process module 17 and is configured to receive a control signal 108 from a transmitter mounted on the bike via the wire or wireless communication method. When a person, who wears the indication clothing 8, 9 and rides the bike, wants to operate the bike to turn left or right, he can use a switch mounted on the bike to control the transmitter to transmit the control signal 108 to the receiver 23. After receiving the control signal 108, the process module 17 controls the indication sign 11b or the indication sign 11c according to the control signal 108. Thus, other people surrounding the bike can be aware that the bike will turn left or right when the left-turn sign or right-turn sign is lighted up, so as to prevent a traffic accident.

Figure 10:
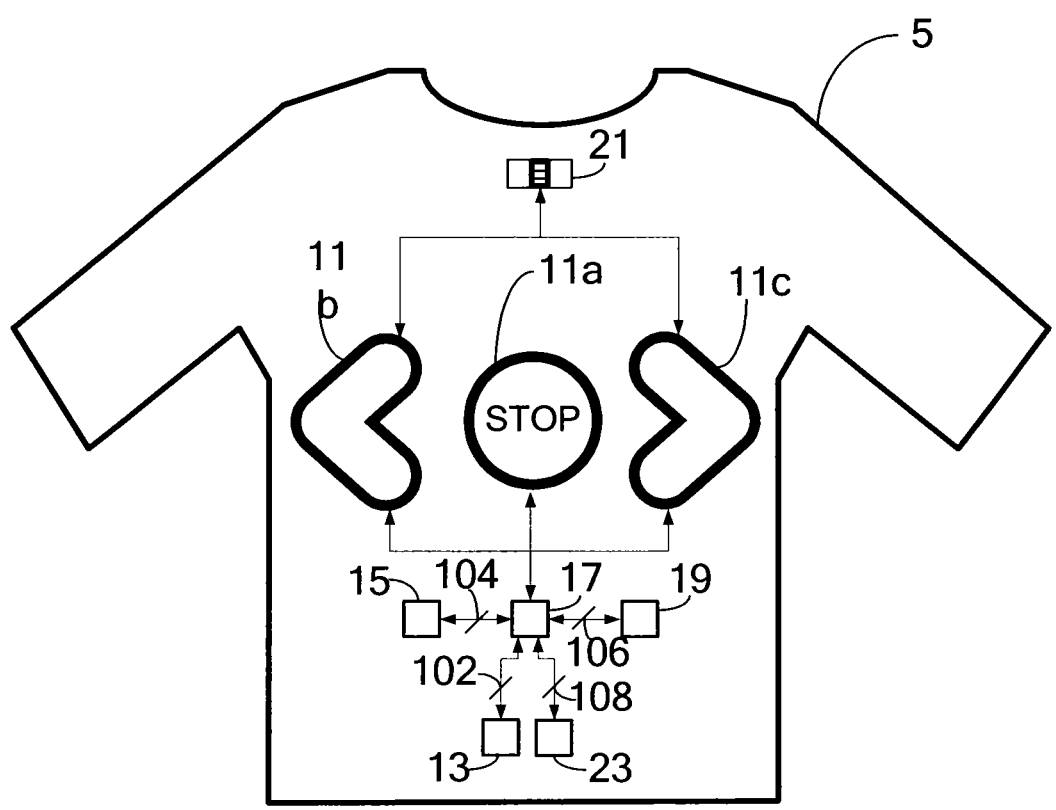
FIG. 10 illustrates the third embodiment with a receiver and a switch.

It should be noted that, as shown in FIG. 10, the indication signs 11a, 11b, 11c, the G-sensor 13, the storage module 15, the process module 17, the gyroscopic sensor 19, the switch 21 and the receiver 23 may be integrated into a indication clothing 10. Persons skilled in the art may easily realize the indication clothing 10 based on the aforementioned description.

In summary, the indication clothing of the present invention is adapted to be worn by an object (e.g. a person riding a bike). The indication clothing can senses the person's instantaneous moving action, such an instantaneous brake action, an instantaneous left-turn action and an instantaneous right-turn action, and indicate the instantaneous moving action via an correspond indication sign positioned on it. Thereby, the indication sign may indicate the instantaneous moving action of the person to other vehicles, bikes and passengers on the road so that they can notice the instantaneous moving action to prevent a traffic accident. Hence, the present invention may efficiently reduce the risk of traffic accident and overcome the defects of the conventional technique.

The above disclosure is related to the detailed technical contents and inventive features thereof. People skilled in this field may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:

1. An indication clothing, being adapted to be worn by an object, comprising:
    an indication sign, comprising a brake sign, a left-turn sign, and a right-turn sign at a front or a rear of the indication clothing, wherein the left-turn sign is adjacent to the brake sign on one side, and the right-turn sign is adjacent to the brake sign on other side;
    a storage module, being configured to store threshold information;
    a G-sensor, being configured to sense an instantaneous moving action of the object and generate a combined vector related to the instantaneous moving action when the object is moving; and
    a process module, being electrically connected to the indication sign, the G-sensor and the storage module, and being configured to generate a sensed value according to the combined vector and control the indication sign by comparing the sensed value with the threshold information so that the indication sign indicates the instantaneous moving action of the object.

2. The indication clothing as claimed in claim 1, wherein each of the brake sign, the left-turn sign, and the right-turn sign is formed of a light-emitting component, the process module compares the sensed value with the threshold information to control one of the light-emitting component to light up for a period of time.

3. The indication clothing as claimed in claim 2, wherein the sensed values includes an x-axis acceleration, the threshold information includes an x-axis threshold, the process module controls the light-emitting component corresponding to the brake sign to light up by comparing the x-axis acceleration with the x-axis threshold.

4. The indication clothing as claimed in claim 2, wherein the the sensed value includes a y-axis acceleration, the threshold information includes a y-axis threshold, the process module controls the light-emitting component corresponding to one of the left-turn sign and the right-turn sign to light up by comparing the y-axis acceleration with the y-axis threshold.

5. The indication clothing as claimed in claim 4, wherein the sensed value includes an x-axis acceleration, the threshold information includes an x-axis threshold, the process module controls the light-emitting component corresponding to the one of the left-turn sign and the right-turn sign to light up by further comparing the x-axis acceleration with the x-axis threshold.

6. The indication clothing as claimed in claim 2, wherein the light-emitting component is one of a light-emitting diode, a fiber optic, a organic light-emitting diode (OLED), an electroluminence (EL), an EL wire, an interferometric modulation (IMOD) and a light bulb.

7. The indication clothing as claimed in claim 1, further comprising a gyroscopic sensor, being configured to sense a horizontal rotation of the object and generate a rotation value related to the horizontal rotation, the process module controls the indication sign by further comparing the rotation value with the threshold information.

8. The indication clothing as claimed in claim 7, further comprising a switch, being electrically connected to the indication sign and being configured to control the indication sign.

9. The indication clothing as claimed in claim 7, being wirelessly connected to a transmitter and further comprising a receiver, the receiver being electrically connected to the process module and being configured to receive a control signal from the transmitter so that the process module further controls the indication sign according to the control signal.

10. The indication clothing as claimed in claim 7, being connected to a transmitter and further comprising a receiver, the receiver being electrically connected to the process module and being configured to receive a control signal from the transmitter so that the process module further controls the indication sign according to the control signal.

11. The indication clothing as claimed in claim 1, further comprising a switch, being electrically connected to the indication sign and being configured to control the indication sign.

12. The indication clothing as claimed in claim 11, being wirelessly connected to a transmitter and further comprising a receiver, the receiver being electrically connected to the process module and being configured to receive a control signal from the transmitter so that the process module further controls the indication sign according to the control signal.

13. The indication clothing as claimed in claim 11, being connected to a transmitter and further comprising a receiver, the receiver being electrically connected to the process module and being configured to receive a control signal from the transmitter so that the process module further controls the indication sign according to the control signal.

* * * * *